(12) United States Patent
Takenaka et al.

(10) Patent No.: US 7,710,402 B2
(45) Date of Patent: May 4, 2010

(54) INFORMATION DISPLAY DEVICE AND SUPPORTING FRAME FOR SUPPORTING A PIEZOELECTRIC ELEMENT FOR USE IN INFORMATION DISPLAY DEVICE

(75) Inventors: Mikio Takenaka, Kanagawa (JP); Shigeaki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1009 days.

(21) Appl. No.: 10/926,181

(22) Filed: Aug. 26, 2004

(65) Prior Publication Data

US 2005/0057527 A1 Mar. 17, 2005

(30) Foreign Application Priority Data

Sep. 17, 2003 (JP) .................... P2003-325327

(51) Int. Cl.
*G09G 5/00* (2006.01)
(52) U.S. Cl. .............. 345/173; 178/18.01; 345/174; 345/177; 345/178; 345/158; 382/121; 381/173; 381/190
(58) Field of Classification Search ............... 345/173
See application file for complete search history.

(56) References Cited

U.S. PATENT DOCUMENTS

| | | | | |
|---|---|---|---|---|
| 3,976,899 A | * | 8/1976 | Fanshawe | 310/339 |
| 4,340,777 A | * | 7/1982 | DeCosta et al. | 178/20.02 |
| 4,355,202 A | * | 10/1982 | DeCosta et al. | 178/20.02 |
| 4,411,159 A | * | 10/1983 | Spear et al. | 73/768 |
| 4,479,385 A | * | 10/1984 | Koehler | 73/514.29 |
| 4,511,760 A | * | 4/1985 | Garwin et al. | 178/18.03 |
| 4,550,384 A | * | 10/1985 | Kimura | 700/303 |
| 4,558,757 A | * | 12/1985 | Mori et al. | 178/18.05 |
| 4,594,898 A | * | 6/1986 | Kirman et al. | 73/778 |

(Continued)

FOREIGN PATENT DOCUMENTS

JP 04-355509 12/1992

(Continued)

OTHER PUBLICATIONS

Japanese Office Action issued Mar. 25, 2009 for corresponding Japanese Application No. 2003-325327.

*Primary Examiner*—Sumati Lefkowitz
*Assistant Examiner*—Grant D Sitta
(74) *Attorney, Agent, or Firm*—Rader, Fishman & Grauer PLLC

(57) ABSTRACT

An information display device (1A) comprises a touch panel (TP), an information display panel (LCD) located under the touch panel (TP) and four strip-like piezoelectric elements (E), which are caused to be vibrated and displaced by a pressing force generated when the touch panel (TP) is pressed, being disposed at the outer peripheral portion of the touch panel (TP), wherein both end portions of each strip-like piezoelectric element (E) are supported by surface-like holders (112A, 112B) with twist resilient deformation structures and a rotary shaft (113) so that each strip-like piezoelectric element (E) may not be disturbed from being vibrated and displaced. In this touch panel type information device, both end portions of a plurality of strip-like piezoelectric elements are supported by the supporting member having the holders with the twist resilient deformation structure which do not disturb both end portions of the strip-like piezoelectric elements from being vibrated and displaced.

12 Claims, 11 Drawing Sheets

U.S. PATENT DOCUMENTS

| | | | | |
|---|---|---|---|---|
| 4,649,313 A * | 3/1987 | Ogawa et al. | ............... | 310/358 |
| 4,764,244 A * | 8/1988 | Chitty et al. | ................. | 216/20 |
| 4,775,765 A * | 10/1988 | Kimura et al. | ............. | 345/173 |
| 4,887,245 A * | 12/1989 | Mori et al. | ................. | 367/129 |
| 4,949,799 A * | 8/1990 | Wernimont | ................ | 177/211 |
| 5,014,555 A * | 5/1991 | Haines | .................... | 73/514.39 |
| 5,020,370 A * | 6/1991 | Deval et al. | .............. | 73/514.29 |
| 5,421,213 A * | 6/1995 | Okada | .................. | 73/862.043 |
| 5,423,227 A * | 6/1995 | Polaert et al. | .......... | 73/862.044 |
| 5,488,873 A * | 2/1996 | Delmas et al. | ......... | 73/862.627 |
| 5,541,892 A * | 7/1996 | Kobayashi et al. | .......... | 367/127 |
| 5,708,460 A * | 1/1998 | Young et al. | ................ | 345/173 |
| 5,714,694 A * | 2/1998 | Diessner | ............... | 73/862.632 |
| 5,781,646 A * | 7/1998 | Face | .......................... | 381/190 |
| 5,854,625 A * | 12/1998 | Frisch et al. | ............... | 345/173 |
| 6,107,726 A * | 8/2000 | Near et al. | ................. | 310/328 |
| 6,429,846 B2 * | 8/2002 | Rosenberg et al. | .......... | 345/156 |
| 6,555,235 B1 * | 4/2003 | Aufderheide et al. | ....... | 428/447 |
| 6,627,918 B2 * | 9/2003 | Getz et al. | .................... | 257/59 |
| 6,822,635 B2 * | 11/2004 | Shahoian et al. | ............ | 345/156 |
| 6,854,625 B2 * | 2/2005 | Tedeschi | ..................... | 223/111 |
| 6,936,985 B2 * | 8/2005 | Pankey et al. | ............... | 318/443 |
| 7,190,350 B2 * | 3/2007 | Roberts | ....................... | 345/173 |
| 7,196,694 B2 * | 3/2007 | Roberts | ....................... | 345/173 |
| 2002/0005838 A1 * | 1/2002 | Inoue et al. | ................. | 345/173 |
| 2002/0149571 A1 * | 10/2002 | Roberts | ....................... | 345/174 |
| 2002/0175836 A1 * | 11/2002 | Roberts | ....................... | 341/34 |
| 2004/0233174 A1 * | 11/2004 | Robrecht et al. | ............ | 345/173 |
| 2004/0239647 A1 * | 12/2004 | Endo | .......................... | 345/173 |
| 2005/0099401 A1 * | 5/2005 | Matsumoto et al. | ......... | 345/173 |

FOREIGN PATENT DOCUMENTS

| | | | |
|---|---|---|---|
| JP | 09-130199 | | 5/1997 |
| JP | 11-196492 | | 7/1999 |
| JP | 011-0212725 | | 8/1999 |
| JP | 2000-269563 | | 9/2000 |
| JP | 2000269563 A | * | 9/2000 |
| JP | 2002-259059 | | 9/2002 |
| JP | 2002-333952 | | 11/2002 |
| JP | 2003-015814 | | 1/2003 |

* cited by examiner

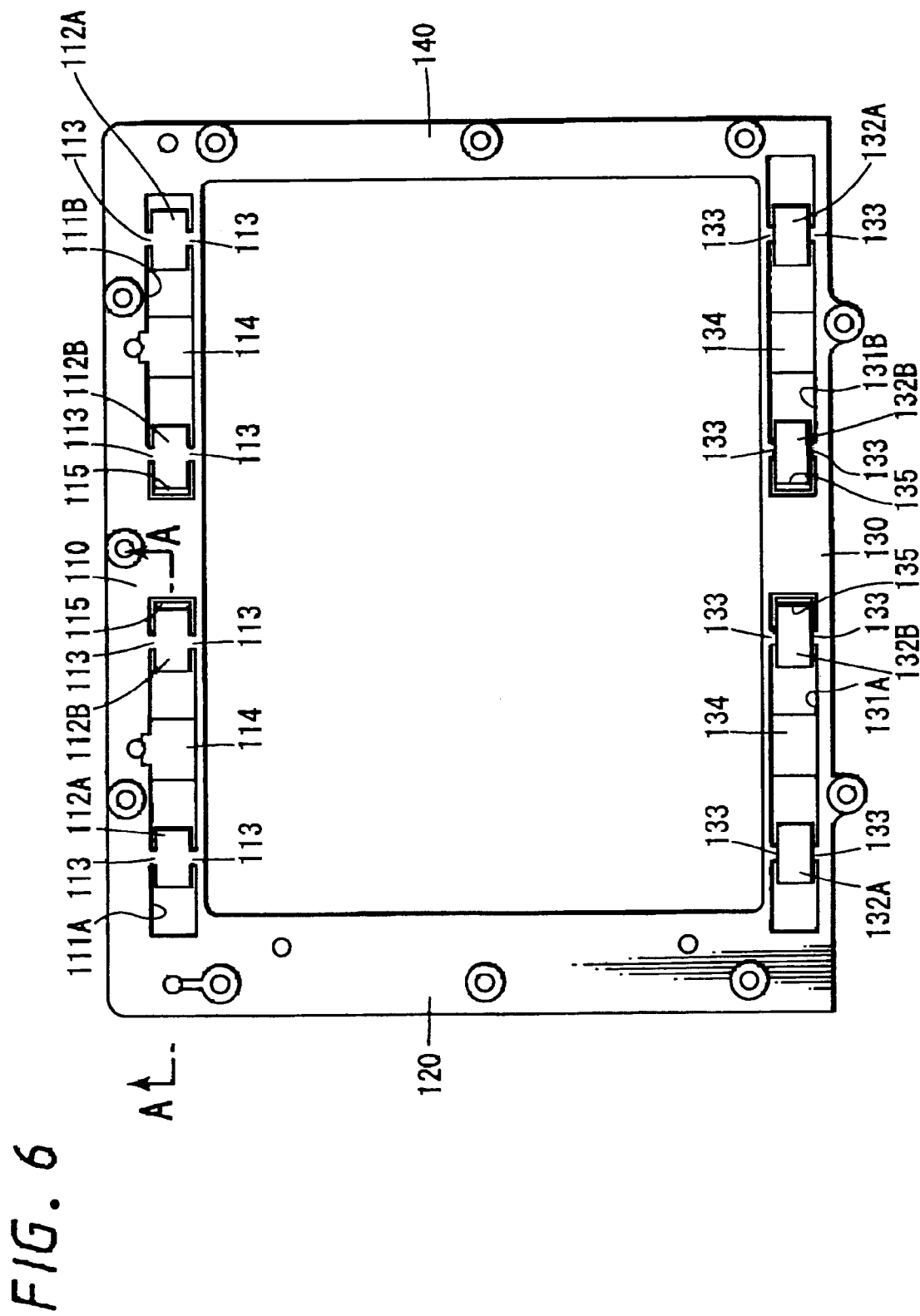

INFORMATION DISPLAY DEVICE AND SUPPORTING FRAME FOR SUPPORTING A PIEZOELECTRIC ELEMENT FOR USE IN INFORMATION DISPLAY DEVICE

BACKGROUND OF THE INVENTION

1. Field of the Invention

The present invention relates to an information display device, such as FA (factory automation) equipment, a vending machine, a ticket-vending machine, an automated cash dispenser, electronic household appliances, medical operation devices, information devices, and a game machine, by which information can be transmitted to an operator through both the sense of sight and the sense of touch and a supporting frame for use with a piezoelectric element in such an information display device.

2. Description of the Related Art

The arrangement and structure of an information display device disclosed in Japanese laid-open patent application No. 11-212725, will be described below with reference to the drawings as an example of a related-art information display device.

FIG. 1 is a cross-sectional side view showing an information display device according to the related art, and FIG. 2 is a cross-sectional view showing a support structure for supporting a piezoelectric element according to the related art.

An information display device according to the related art, generally denoted by the reference numeral 1 in FIG. 1, is disclosed in Japanese laid-open patent application No. 11-212725. As shown in FIG. 1, an operation panel 10 is disposed on a liquid-crystal display (LCD) panel 20, and this operation panel is supported by piezoelectric elements E1 to E4. When the user presses an operation surface 11 of the operation panel 10 with a finger, a voltage is generated across both ends of the piezoelectric elements E1 to E4, and it is possible to detect the operation force and the operation position by detecting and calculating the thus generated voltage. When the operation force of a magnitude larger than a predetermined threshold value is detected, a high frequency is supplied to the piezoelectric elements E1 to E4, whereby the operation surface 11 is vibrated. Thus, the operator can reliably feel the sense of operation from the above vibration. As described above, the common piezoelectric elements E1 to E4 can detect the operation force to the operation surface 11 and can vibrate the operation surface 11. In FIG. 1, reference numeral 30 denotes the case of this information display device according to the related art.

Japanese laid-open patent application No. 2002-259059 discloses a panel structure by which a period of the sense of power is given to the sense of touch of the finger of the operator and an input device of an information display device using a piezoelectric element.

An example of the support structure for the aforementioned piezoelectric elements E1 to E4 (typically represented as a "piezoelectric element E") will be described with reference to FIG. 2. As shown in FIG. 2, the structure of this support structure is such that a strip-like piezoelectric element E (hereinafter referred to as a "strip-like piezoelectric element E") is supported at its respective end portions in a line-contact fashion by hard protruded members Na, Nb whose supporting portions are shaped like dots, or lines and both sides of the protruded portions Na, Nb and the lower surface of the strip-like piezoelectric element E are bonded by a soft material member Ad.

Since this supporting structure uses the dot-like or linear protruded members Na, Nb, there is the advantage that the strip-like piezoelectric element E cannot be disturbed from being deformed as a restriction of the direction in which the touch of sense is transmitted to the operator. Also, the strip-like piezoelectric element E and the protruded members Na, Nb can be bonded together by using the soft material member Ad like the adhesive. In FIG. 2, reference character LCD denotes a liquid-crystal display panel.

[Cited Patent Reference 1]:
Japanese laid-open patent application No. 11-212725 (page 1, FIG. 1)

[Cited Patent Reference 2]:
Japanese laid-open patent application No. 2002-259059 (pages 1 and 7 and FIG. 6)

However, in the case of this supporting structure, the protruded members Na, Nb has to be bonded to and fixed to the strip-like piezoelectric element E in advance. Therefore, problems arise, in which assembly efficiency is very poor and in which dispersions of the displacement of the supporting structure of the piezoelectric element due to the assembly are large.

SUMMARY OF THE INVENTION

In view of the aforesaid aspect, it is an object of the present invention to provide an information display device using a twist resilient deformation structure, which does not disturb a strip-like piezoelectric element from being deformed as restraints in the direction in which the sense of touch is transmitted to the operator, and a supporting structure which can provide a sufficiently wide area in which the piezoelectric element and its supporting member can be bonded together.

It is other object of the present invention to provide an information display device that can be assembled with ease.

It is a further object of the present invention to provide a strip-like piezoelectric element supporting frame for use with such information display device.

According to an aspect of the present invention, there is provided an information display device which is comprised of a touch panel, an information display panel located under the touch panel and a plurality of strip-like piezoelectric elements caused to be vibrated and displaced by a pressing force for pressing the touch panel, with a plurality of strip-like piezoelectric elements being disposed at the outer peripheral portion of the touch panel, and wherein the respective strip-like piezoelectric elements are supported at their respective end portions by members having torsion resilient deformation structures which do not disturb the strip-like piezoelectric elements from being vibrated and displaced.

According to another aspect of the present invention, there is provided an information display device which is comprised of a touch panel, an information display panel located under the touch panel and a plurality of strip-like piezoelectric elements caused to be vibrated and displaced by a pressing force for pressing the touch panel, a plurality of strip-like piezoelectric elements being disposed at the outer peripheral portion of the touch panel, wherein the respective strip-like piezoelectric elements are supported at their respective end portions by a supporting frame having surface-like holders with torsion resilient deformation structures which do not disturb said strip-like piezoelectric elements from being vibrated and displaced.

According to a further aspect of the present invention, there is provided a piezoelectric element supporting frame for use with an information display device having a structure which is comprised of a pair of surface-like holders having torsion resilient deformation structures, which do not disturb a strip-like piezoelectric element from being vibrated and displaced, being formed at both end portion sides of a rectangular hole and a stopper for limiting the lower limit of vibration and displacement of the central portion of the strip-like piezoelectric element being formed on the frame at the surface lower than the supporting surfaces of the two surface-like holders.

According to a further aspect of the present invention, there is provided an information display device which is comprised of a touch panel, an information display panel located under the touch panel and a plurality of strip-like piezoelectric elements caused to be vibrated and displaced by a pressing force for pressing the touch panel, a plurality of strip-like piezoelectric elements being disposed at the outer peripheral portion of the touch panel, wherein the respective strip-like piezoelectric elements are fixed to a flexible printed wiring board, both end portions of the flexible printed wiring board are led out, the respective strip-like piezoelectric elements are supported by a supporting member formed on a frame so that they can be vibrated and displaced at least at one portion of their lower surfaces, and predetermined lengths are provided such that the two led-out portions of the flexible printed wiring board can be twisted and deformed with resiliency, the two led-out portions at the outside of the portion that is twisted and deformed with resiliency being fixed to a fixed portion of the frame and supported by a supporting frame.

According to yet a further aspect of the present invention, there is provided a piezoelectric element supporting frame for use with an information display device having a structure which is comprised of a supporting member which does not disturb a strip-like piezoelectric element from being vibrated and displaced being provided at the predetermined position of a rectangular hole, a stopper for limiting a lower limit of vibration and displacement of a central portion of the strip-like piezoelectric element being provided on the surface of the level lower than the upper surface of the supporting member, a fixed portion being formed on both end portions of the rectangular hole and a fixed portion having a positioning portion being formed on a frame at the same level surface as that of the upper surface of the supporting member.

In accordance with yet a further aspect of the present invention, there is provided an information display device which is comprised of a touch panel, an information display panel located under the touch panel and a plurality of strip-like piezoelectric elements caused to be vibrated and displaced by pressing force for pressing the touch panel, a plurality of strip-like piezoelectric elements being disposed at the outer peripheral portion of the touch panel, wherein the respective strip-like piezoelectric elements are fixed to a flexible printed wiring board, both end portions of the flexible printed wiring board are led out, the respective strip-like piezoelectric elements are supported by a supporting member formed on a frame so that they can be vibrated and displaced at two portions of their lower surfaces, and predetermined lengths are provided such that the two led-out portions of the flexible printed wiring board can be twisted and deformed with resiliency, the two led-out portions at the outside of the portion that is twisted and deformed with resiliency being properly positioned by a protruded portion of the frame and fixed to a fixed portion of the same level surface as the upper surface of the supporting member and the two led-out portions at the outside of the other end portion that is twisted and deformed with resiliency are fixed to a fixed portion of the same level surface as the upper surface of the supporting member of the frame and supported by a supporting frame.

In accordance with still a further aspect of the present invention, there is provided a piezoelectric element supporting frame for use with an information display device having a structure which is comprised of a pair of supporting members, which do not disturb a strip-like piezoelectric element from being vibrated and displaced, being provided at predetermined space positions of a rectangular hole, a stopper for limiting a lower limit of vibration and displacement of a central portion of the strip-like piezoelectric element being provided on the surface of the level lower than the upper surfaces of a pair of supporting members, a fixed portion being formed on both end portions of the rectangular hole and a fixed portion having a positioning protruded portion being formed on a frame at the same level surface as that of the upper surface of the supporting member.

Therefore, according to the present invention, there can be achieved excellent effects. More specifically, the amount in which the vibration displacement produced by the piezoelectric element is lost when the piezoelectric element is fixed can be minimized in all attitudes of the touch panel while the piezoelectric element is being supported and fixed at its respective end portions on the surface.

Further, when the piezoelectric element is assembled, the piezoelectric element is urged against the holder or engaged with the holder and thereby properly positioned. Then, both end portions of the piezoelectric elements are fixed by double-sided adhesive tape, and hence it becomes very easy to assemble the piezoelectric element of the present invention as compared with the piezoelectric element having the related-art structure.

Furthermore, since the position at which the strip-like piezoelectric element is attached to the holder and the surface supporting position of the strip-like piezoelectric element at both end portions can be stabilized, it is possible to improve considerably the amount in which the vibration displacement is dispersed due to the assembly.

In addition, according to the present invention, it becomes possible to attain the objects of minimizing the loss of the vibration displacement of the piezoelectric element and minimizing dispersions of the assembly of the piezoelectric element by the minimum number of assemblies without increasing the thickness of the operation input and output device even when at least one end portion of the piezoelectric element is fixed at surface.

BRIEF DESCRIPTION OF THE DRAWINGS

FIG. 6 is a plan view showing a supporting frame for supporting four piezoelectric elements according to a first embodiment of the present invention;

FIGS. 7A and 7B show a part of the supporting frame shown in FIG. 6, wherein FIG. 7A is a plan view showing the frame of one side of the supporting frame shown in FIG. 6 and FIG. 7B is a partly enlarged, cross-sectional view taken along the line A-A in FIG. 6;

FIGS. 8A to 8D show a strip-like piezoelectric element suitable for use with an information display device according to the present invention, wherein FIG. 8A is a plan view of the strip-like piezoelectric element, FIG. 8B is a side view of the strip-like piezoelectric element, FIG. 8C is a side view of the strip-like piezoelectric element, and FIG. 8D is an enlarged cross-sectional view showing the portion shown by an arrow D in FIG. 8C;

FIGS. 10A to 10D are respectively diagrams showing the supporting frame with the strip-like piezoelectric element mounted thereon according to the second embodiment of the present invention, wherein FIG. 10A is a plan view showing a part of the supporting frame, FIG. 10B is a cross-sectional side view taken along the line B-B in FIG. 10A, FIG. 10C is a cross-sectional side view taken along the line C-C in FIG. 10A, and FIG. 10D is a partly enlarged cross-sectional side view of FIG. 10C;

FIGS. 12A to 12E are respectively diagrams showing the supporting frame with the strip-like piezoelectric element mounted thereon according to the third embodiment of the present invention, wherein FIG. 12A is a plan view showing a part of the supporting frame according to the third embodiment of the present invention, FIG. 12B is a side view showing the supporting frame according to the third embodiment from the arrow B direction in FIG. 12A, FIG. 12C is a side view showing the supporting frame according to the third embodiment from the arrow C direction in FIG. 12A, FIG. 12D is a cross-sectional side view taken along the line D-D in FIG. 12A, and FIG. 12E is a partly enlarged cross-sectional view of FIG. 12D.

DESCRIPTION OF THE PREFERRED EMBODIMENTS

An information display device according to the present invention and a supporting frame for supporting a piezoelectric element in the information display device according to the present invention will hereinafter be described with reference to the drawings.

Figure 1:
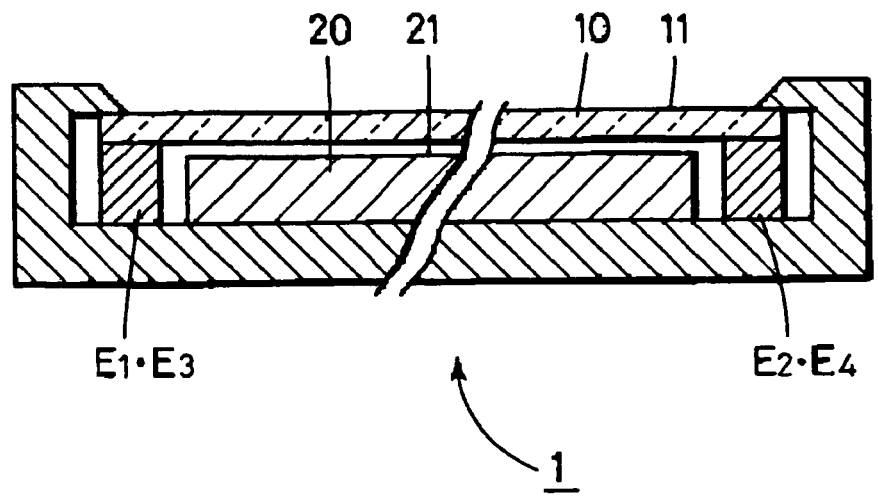
FIG. 1 is a cross-sectional side view showing an information display device according to the related art.
Figure 2:
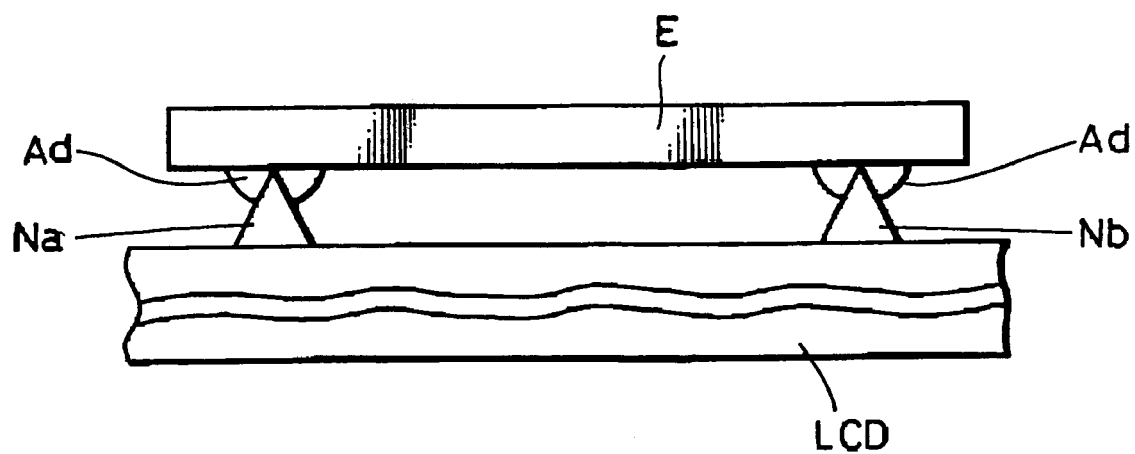
FIG. 2 is a cross-sectional view showing one supporting structure of a piezoelectric element according to the related art.
Figure 3:
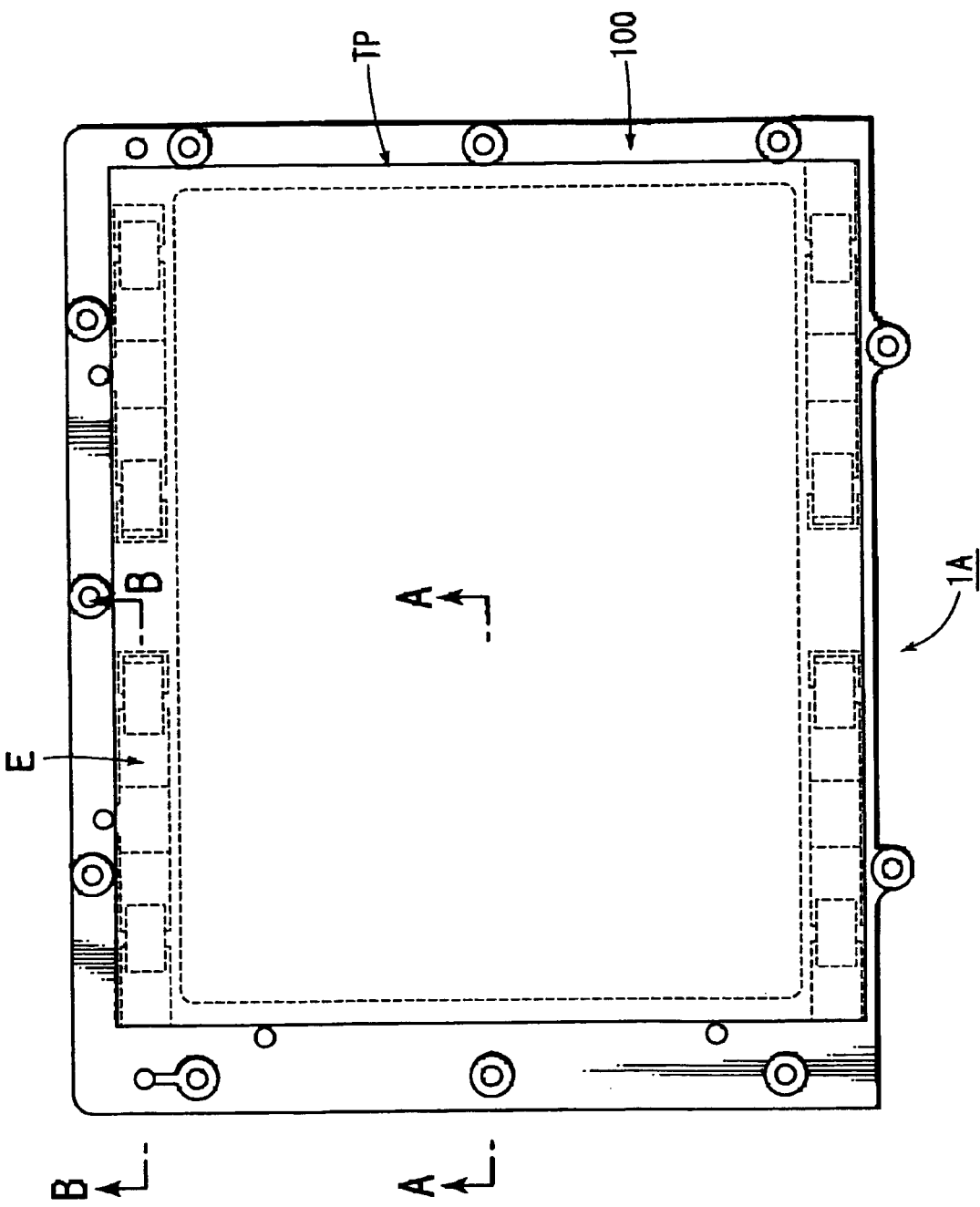
FIG. 3 is a plan view showing an information display device according to an embodiment of the present invention.
Figure 4:
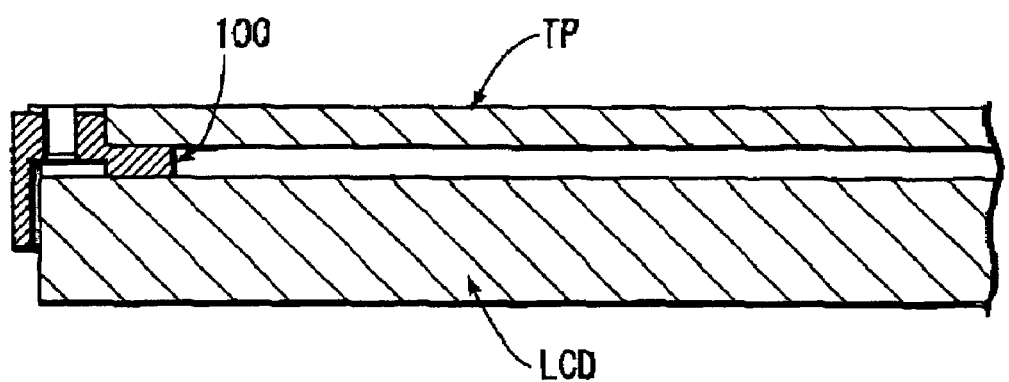
FIG. 4 is a partly enlarged, cross-sectional view taken along the line A-A in FIG. 3.
Figure 5:
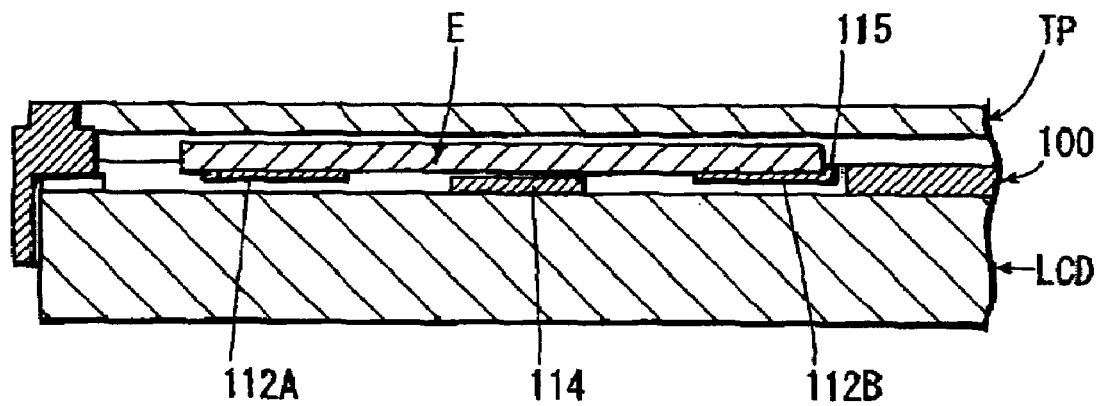
FIG. 5 is a partly enlarged, cross-sectional view taken along the line B-B in FIG. 3.

A first embodiment of the present invention will be described. First, an information display device according to the present invention will be described with reference to FIGS. 3 to 5. FIG. 3 is a plan view of the information display device according to the embodiment of the present invention; FIG. 4 is a partly enlarged cross-sectional side view taken along the line A-A of the information display device shown in FIG. 3; and FIG. 5 is a partly enlarged cross-sectional side view taken along the line 5B-5B of the information display device shown in FIG. 3.

In FIG. 3, reference numeral 1A generally depicts an information display device according to the first embodiment of the present invention. As shown in FIG. 3, this information display device 1A is supported by a quadrilateral supporting frame 100 and is composed of an information display panel LCD and a touch panel TP laminated with each other through four pairs of strip-like piezoelectric elements E (which will be described later on).

Figure 7A:
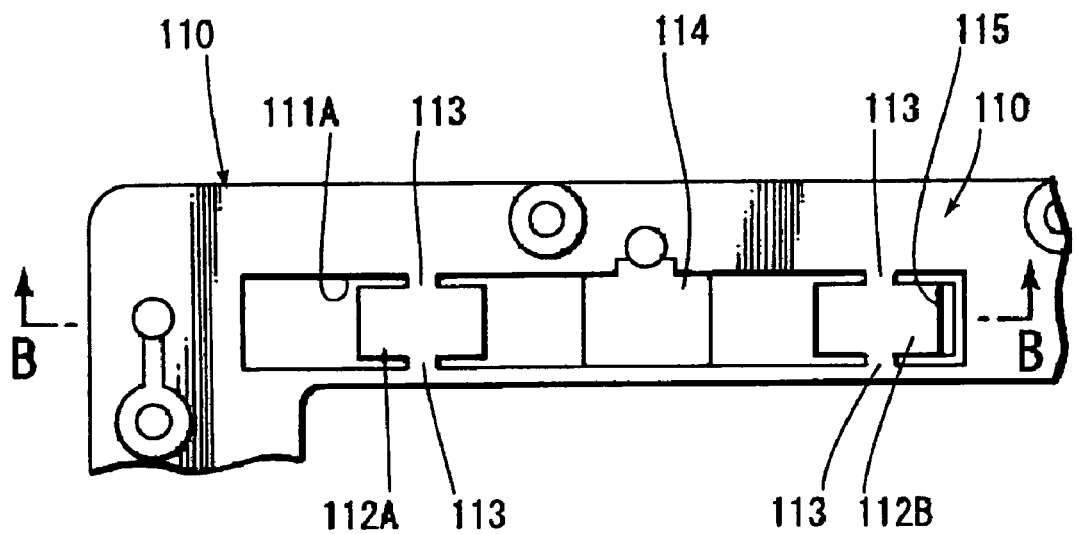
Figure 7B:
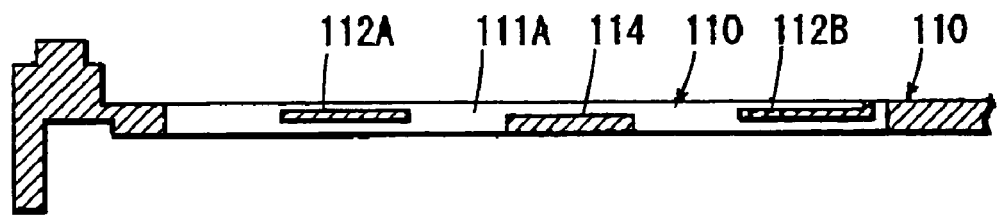

The supporting frame 100 is made of a resin and is a molded product of the resin. As shown in FIG. 6, which is a plan view showing the whole of the supporting frame 100, 110, 120, 130, 140 of respective sides constitute a quadrilateral, and the opposing frames 110 and 130 have rectangular holes 111A, 111B and rectangular holes 131A, 131B formed thereon. These rectangular holes 111A, 111B, 131A, 131B are all the same in shape and dimension. Because the rectangular holes 111A, 111B and the rectangular holes 131A, 131B are symmetrical with respect to these central portions, the rectangular hole 111A is represented and illustrated in FIGS. 7A, 7B in an enlarged scale. FIG. 7B is a cross-sectional side view taken along the line B-B in FIG. 7A.

The arrangement and structure of the portion, shown in FIGS. 7A, 7B, of this frame 111 will be described. A pair of rectangular surface-like holders 112A, 112B of torsion resilient deformation structure which cannot disturb the piezoelectric elements from being vibrated and displaced are formed on both end portions of the rectangular hole 111A (a pair of surface-like holders 132A, 132B are formed on the frame 130). The pair of surface-like holders 112A, 112B are supported at the central portions of both long sides by a rotary shaft 113 joined to the frame 110 so that the surface-like holders 112A, 112B can swing around this rotary shaft 113. The surfaces of the surface-like holders 112A, 112B are flushed with each other in level. Then, a butting portion 115 is formed on the outer end portion of one surface-like holder 112B (a butting portion 135 is formed on the outer end portion of the frame 135). A stopper 114 for limiting the lower limit in which the central portion of the strip-like piezoelectric element E is vibrated and displaced is formed on the central portion between the two surface-like holders 112A, 112B at the height level slightly lower than the surfaces of these surface-like holders 112A, 112B (a stopper 134 is formed on the frame 130) and it is fixed to the frame 110.

By way of example, the dimensions of the respective portions will be described below. The frame 110 at the portion where the rectangular hole 111A is formed is 0.7 mm thick, and the rectangular hole 111A is 35 mm long and 3.4 mm wide. The surface-like holders 112A, 112B are 0.4 mm thick, 6 mm long and 3.4 mm wide. The butting portion 115 is 0.5 mm high. Further, the rotary shaft 113 is 1.5 mm wide. Further, the stopper 114 is 6 mm long, 3.4 mm wide, and the height of the surface of the stopper 114 is held at the height level lower than the surface of the surface-like holders 112A, 112B by 0.1 mm. These dimensions may apply for the dimensions of the respective elements on the side of the frame 130 as well.

Figure 8A:
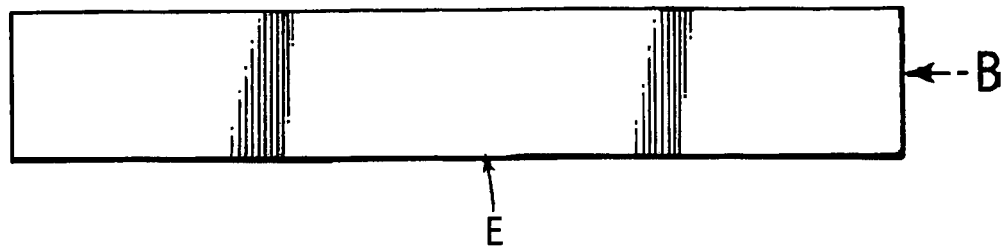
Figure 8B:
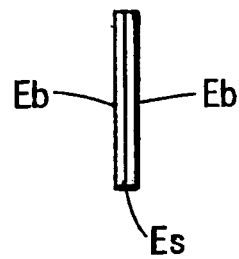
Figure 8C:
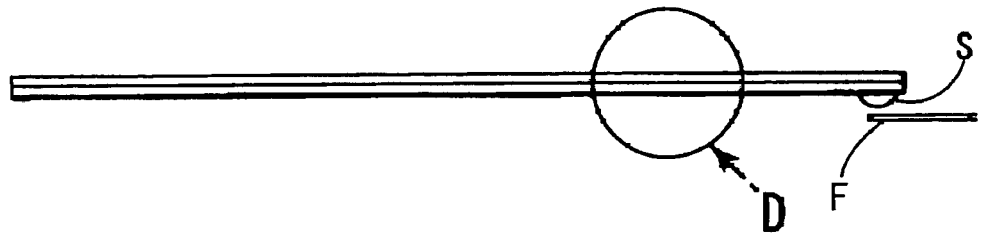
Figure 8D:
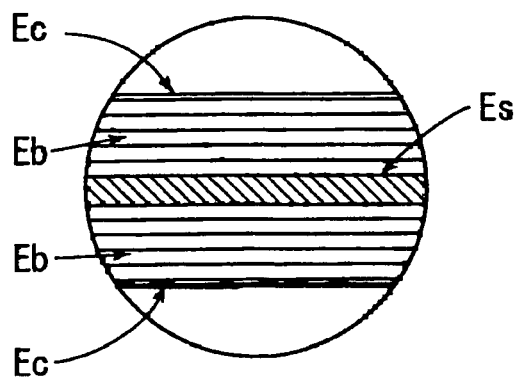

An example of the strip-like piezoelectric element E mounted on the frames 110, 130 will be described with reference to FIGS. 8A to 8D. FIG. 8A is a plan view of the strip-like piezoelectric element E; FIG. 8B is an end surface view showing the strip-like piezoelectric element E from the direction shown by an arrow B in FIG. 8A; FIG. 8C is a side view of FIG. 8A; and FIG. 8D is a diagram showing the portion shown by an arrow D in FIG. 8C in an enlarged scale.

This strip-like piezoelectric element E is a bimorph type piezoelectric element and is composed of piezoelectric ceramic layers Eb in which the overall thickness of one side composed of five layers is 0.25 mm across a 0.1 mm-thick stainless steel shim Es. The surfaces of the piezoelectric ceramic layers Eb are coated with a coating agent (e.g., coating agent manufactured by Tamura Kaken Corporation under the trade name of "USR-2G" as shown in FIG. 8D), and the whole thickness of this strip-like piezoelectric element E is approximately 0.85 mm. In FIG. 8C, reference letter S denotes a solder formed on one end of the strip-like piezoelectric element E; and a flexible printed wiring board F having a thickness of about 0.3 mm is connected to the solder S. The flexible printed wiring board F shown in FIG. 8C is connected to one end portion of the strip-like piezoelectric element E. According to necessity, the flexible printed wiring board F is connected to both end portions of the strip-like piezoelectric element E. The strip-like piezoelectric element E having the above-mentioned structure is properly positioned by urging one end portion against the butting portion 115 of the surface-like holder 112B. Thereafter, the one end portion is bonded to the surface-like holder 112B and the other end portion of the strip-like piezoelectric element E is bonded to the surface-like holder 112A. In this manner, the other three strip-like piezoelectric elements E are mounted to the surface-like holders 112A, 112B and the pair of surface-like holders 132A, 132B of the side of the frame 130.

When the support frame 100 having the above-mentioned arrangement and structure is attached to the upper portion of the information display panel LCD on which the touch panel TP is mounted, there can be obtained the information display device 1A according to the present invention shown in FIG. 3.

Figure 9A:
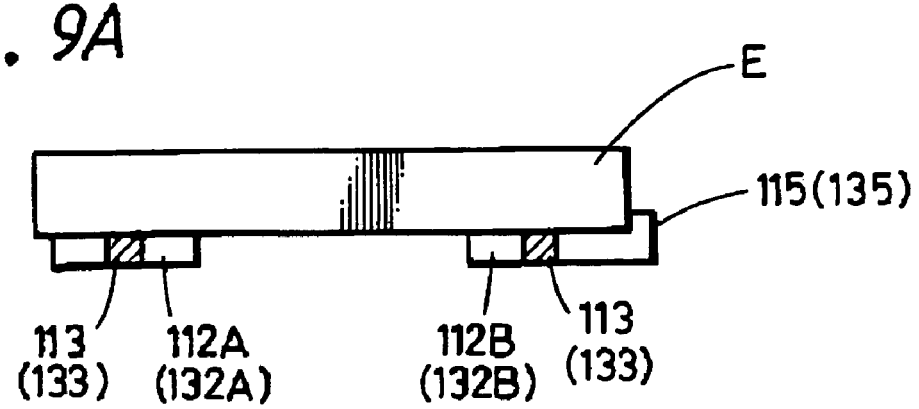
FIGS. 9A to 9C are respectively principle diagrams used to explain the manner in which the strip-like piezoelectric element mounted on the supporting frame according to the first embodiment is operated when the information display device according to the present invention is operated.
Figure 9B:
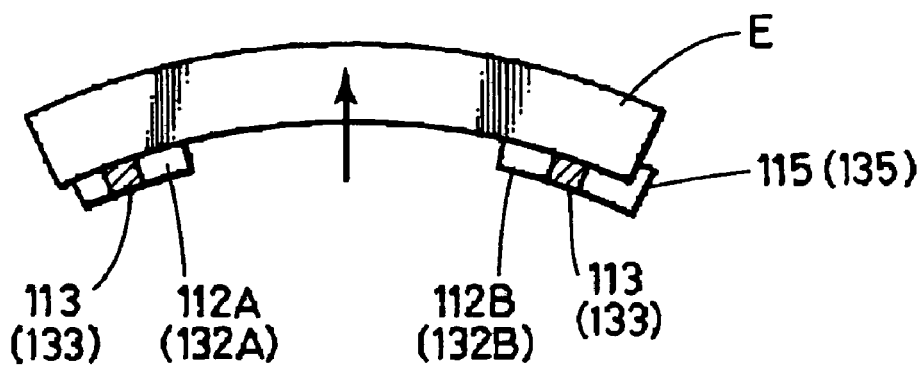
Figure 9C:
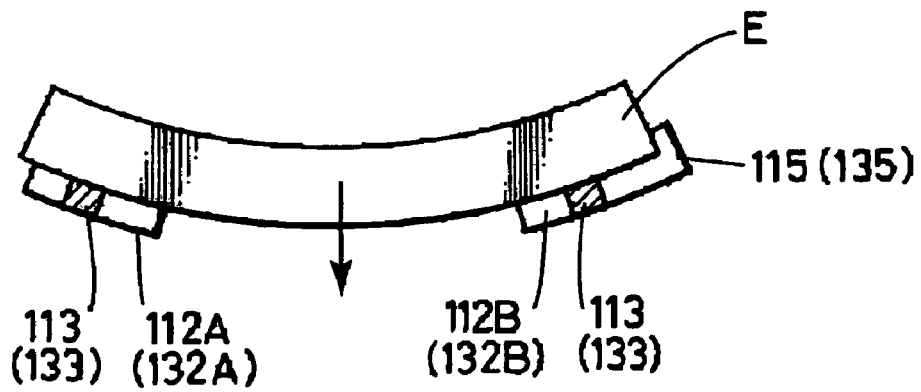

Next, operations of this information display device will be described with reference to FIGS. 9A, 9B and 9C. FIGS. 9A, 9B, 9C are principle diagrams used to explain the manner in which the strip-like piezoelectric element E mounted on the supporting frame 100 according to the first embodiment is operated when the information display device 1A is operated. More specifically, FIG. 9A shows the mode presented when the touch panel TP is not pressed, and FIGS. 9B and 9C show the modes presented when the touch panel TP is pressed by the operator.

When the operator presses the touch panel TP, as shown in FIGS. 9B and 9C, the rotary shaft 113 of the surface-like holders 112A, 1123 and the rotary shaft 113 of the surface-like holders 132A, 132B are given torsion resilient deformation structures and thereby twisted in response to distortions of the respective strip-like piezoelectric elements E, and thereby the strip-like piezoelectric elements E are not disturbed by being vibrated and displaced substantially.

When the operator presses the touch panel TP in this manner, the four strip-like piezoelectric elements E are warped in response to the coordinate axis of the pressed point to generate predetermined voltages, whereby the display at the corresponding portion on the information display device 1A is changed in response to the coordinate axis with accuracy.

Next, a second embodiment of the present invention will be described below. More specifically, the arrangement and structure of a supporting frame 200 according to the second embodiment of the present invention will be described below with reference to FIGS. 10A to 10D and FIGS. 11A to 11C.

Figure 10A:
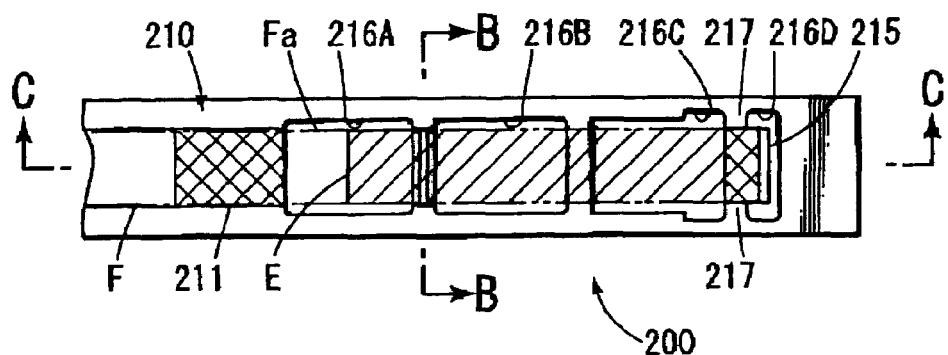
Figure 10B:
Figure 10C:
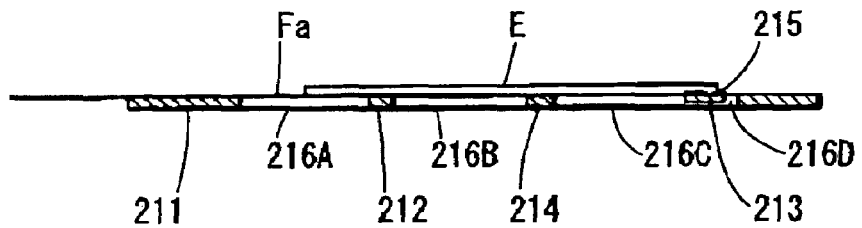
Figure 10D:
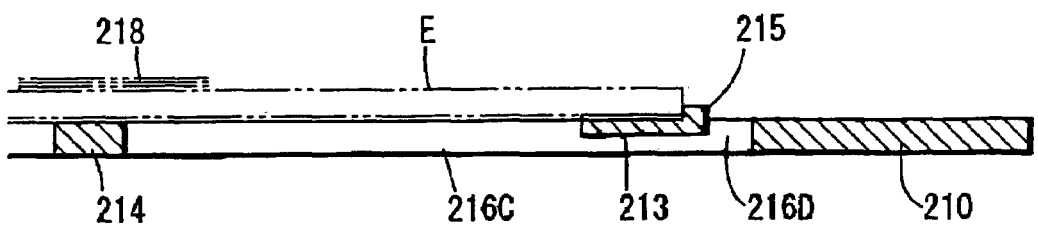
Figure 11A:
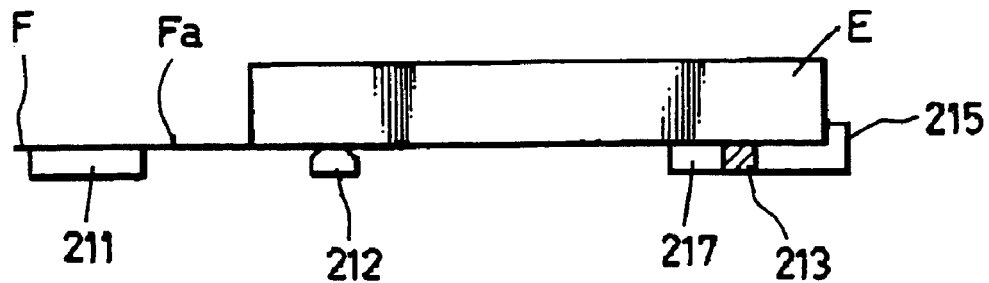
FIGS. 11A to 11C are respectively principle diagrams used to explain the manner in which the strip-like piezoelectric element mounted on the supporting frame according to the first embodiment is operated when the information display device according to the present invention is operated.
Figure 11B:
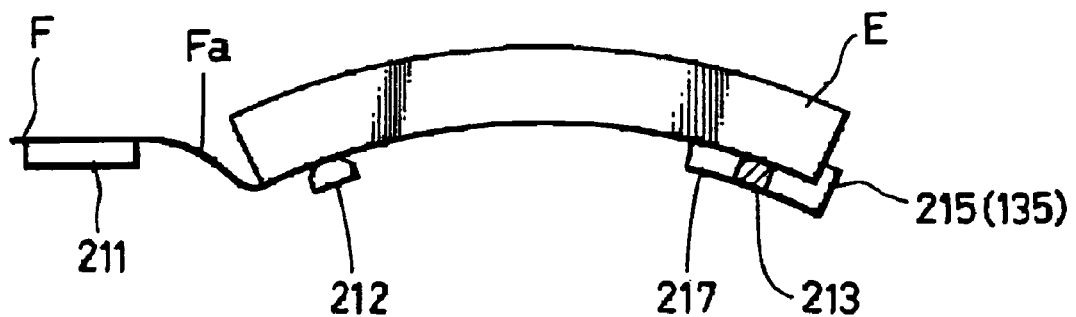
Figure 11C:
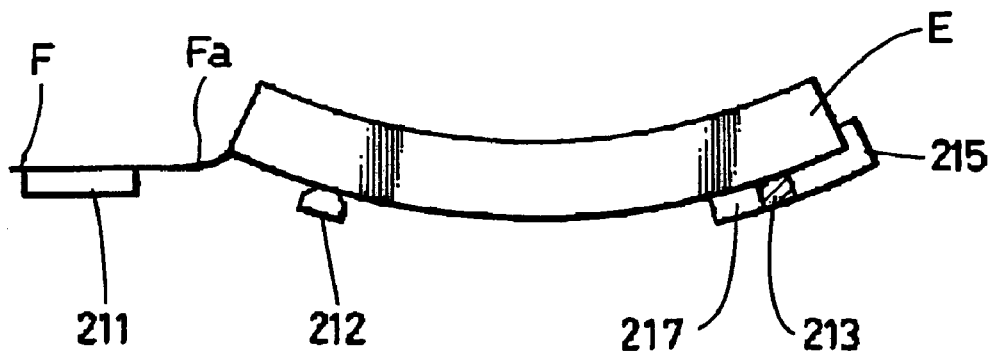

FIGS. 10A to 10D show the supporting frame 200 according to the second embodiment of the present invention in the state in which the strip-like piezoelectric element is mounted on the supporting frame 200, wherein FIG. 10A is a plan view showing a part of the supporting frame 200, FIG. 10B is a cross-sectional side view taken along the line B-B in FIG. 10A, FIG. 10C is a cross-sectional side view taken along the line C-C in FIG. 10A, and FIG. 10D is a partly enlarged, cross-sectional side view of FIG. 10C. FIGS. 11A, 11B, 11C are principle diagrams used to explain the manner in which the strip-like piezoelectric element E mounted on the supporting frame 200 shown in FIGS. 10A to 10D is operated when the information display device 1A is operated.

As illustrated, the supporting frame 200 according to this embodiment includes a frame 210 in which there are formed a holder 211 for bonding and fixing the flexible printed wiring board F, a protruded member 212 for contacting and supporting the rear surface of the end portion on the side to which the flexible printed wiring board F of the strip-like piezoelectric element E is led, a surface-like holder 213 for supporting the other end portion of the strip-like piezoelectric element E and a stopper 214 disposed between the protruded member 212 and the surface-like holder 213. This will apply for the other frame opposing the frame 200 as well, although not shown. A butting portion 215 is formed on the end portion of the surface-like holder 213. Reference numerals 216A, 216B, 216C, 216D denote holes. Also, the surface-like holder 213 formed between the holes 216C and 216D is pivotally supported to the frame 210 by a rotary shaft 217.

The frame 210 is formed with the above-mentioned arrangement and structure. When the strip-like piezoelectric element E is mounted on the frame 210, first, the tip end portion of the strip-like piezoelectric element E is urged against the butting portion 215 and thereby properly positioned, and thereafter the strip-like piezoelectric element E is bonded to and fixed to the surface-like holder 213. The strip-like piezoelectric element E is supported at the rear surface of its end portion near the side to which the flexible printed wiring board F is connected by the protruded member 212 and a part of the flexible printed wiring board F is bonded to and fixed to the holder 211, whereby the strip-like piezoelectric element E is mounted on the frame 210. In FIG. 10D, reference numeral 218 designates a double-sided adhesive by which the touch panel TP (not shown) is bonded and fixed to the strip-like piezoelectric element E.

Since the strip-like piezoelectric element E is mounted on the frame 210 as described above, when the operator presses the touch panel TP, as shown in FIGS. 11A to 11C, the strip-like piezoelectric element E is vibrated while it is being warped. At that time, in the surface-like holder 213, the protruded portion 212 is bent around the rotary shaft 217 by itself. Also, a part Fa of the flexible, printed wiring board F interposed between the strip-like piezoelectric element E and the holder 211 is twisted. The above-mentioned members form the distortion resilient deformation structure shaft, and they are twisted in response to distortions of the respective strip-like piezoelectric elements E, thereby not disturbing the strip-like piezoelectric element E from being vibrated and displaced.

A third embodiment of the present invention will be described next. More specifically, the arrangement and structure of a supporting frame 300 according to the third embodiment of the present invention will be described next with reference to FIGS. 12A to 12E and FIGS. 13A to 13C.

Figure 12A:
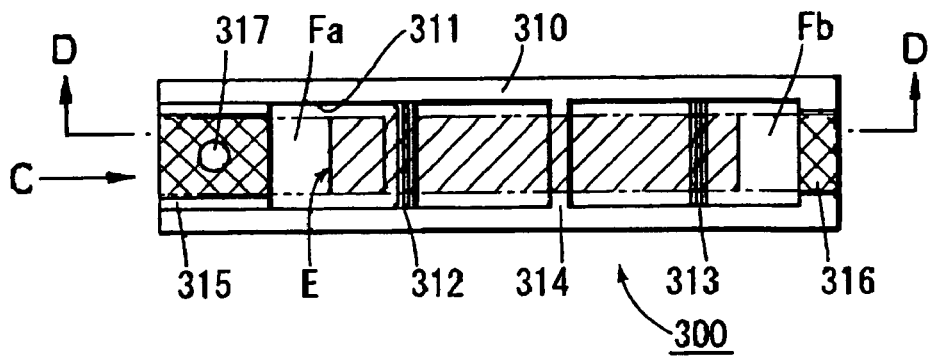
Figure 12B:
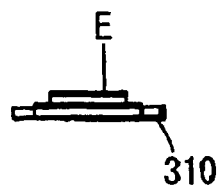
Figure 12C:
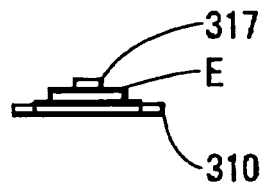
Figure 12D:
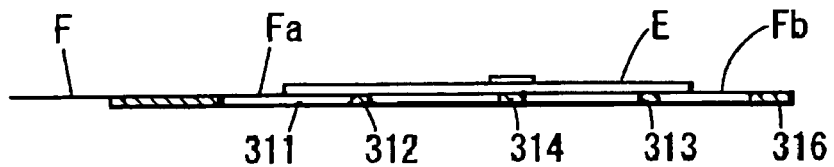
Figure 12E:
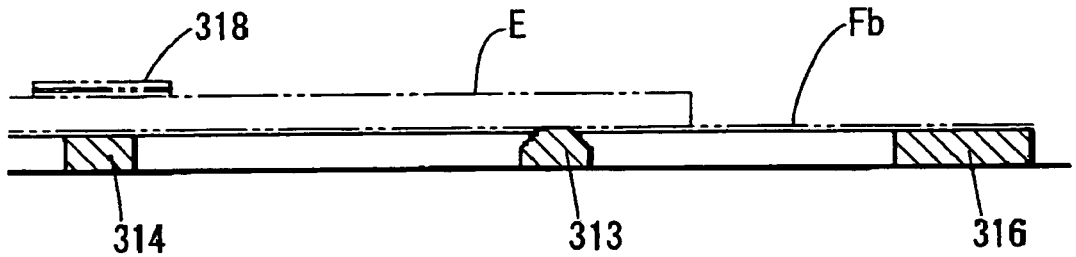
Figure 13A:
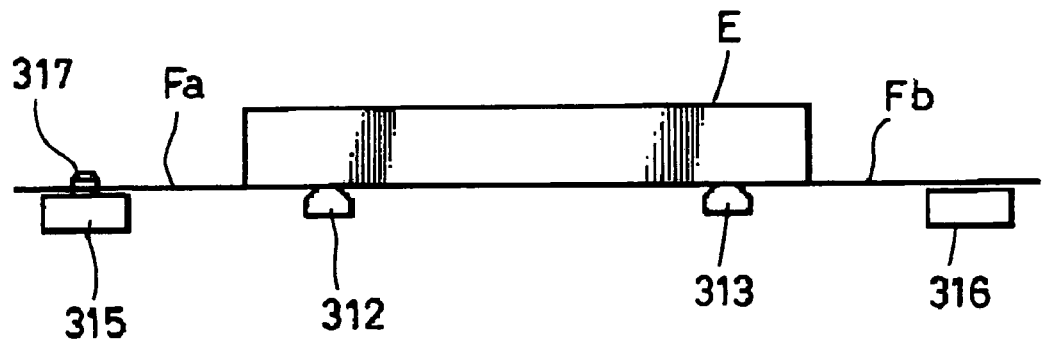
FIGS. 13A to 13C are respectively principle diagrams used to explain the manner in which the strip-like piezoelectric element mounted on the supporting frame according to the third embodiment shown in FIGS. 12A to 12E is operated when the information display device according to the present invention is operated.
Figure 13B:
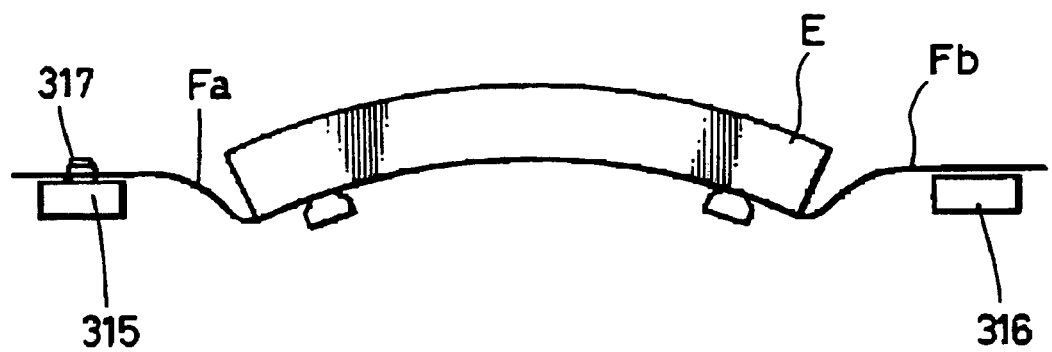
Figure 13C:
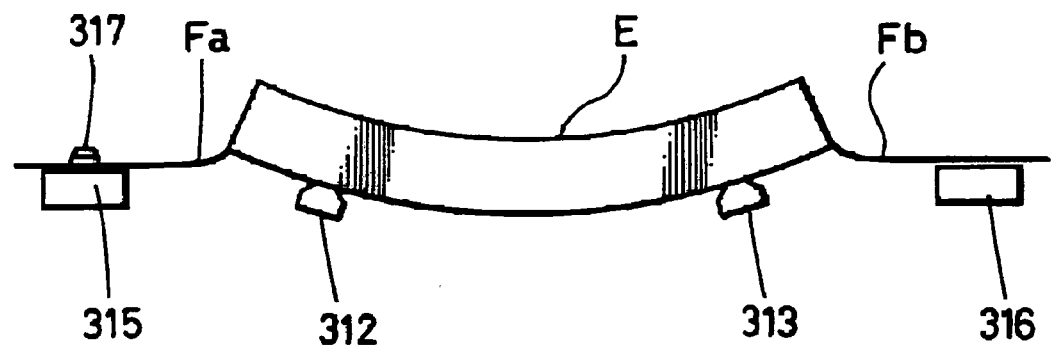

FIGS. 12A to 12E show the supporting frame 300 according to the third embodiment of the present invention in which the strip-like piezoelectric element E is mounted on the supporting frame 300, wherein FIG. 12A is a plan view showing a part of the supporting frame 300, FIG. 12B is a side view showing the supporting frame 300 from the direction shown by an arrow B in FIG. 12A, FIG. 12C is a side view showing the supporting frame 300 from the direction shown by an arrow C in FIG. 12A, FIG. 12D is a cross-sectional side view taken along the line D-D in FIG. 12A, and FIG. 12E is a partly enlarged cross-sectional side view of FIG. 12D. FIGS. 13A to 13C are respectively principle diagrams used to explain the manner in which the strip-like piezoelectric element E mounted on the supporting frame 300 according to the third embodiment shown in FIGS. 12A to 12F is operated when the information display device according to the present invention is operated.

As illustrated, an oblong hole 311 is formed on the frame 310 of one side of this supporting frame 300, and a pair of protruded members 312, 313 that contact and support the rear surface of the strip-like piezoelectric element E is formed near both end portions of the frame 310. Also, a stopper 314 is formed at the central portion of these protruded members 312, 313 at the height level lower than the supporting surfaces of the protruded members 312, 313. Fixed portions 315, 316 are formed at the outsides of both end portions of the rectangular hole 311. An engagement protrusion 317 is vertically formed on the upper surface of the fixed portion 315.

Also, the strip-like piezoelectric element E used in this embodiment has the flexible printed wiring boards F connected to its respective ends. One flexible printed wiring board F has a hole into which there is engaged the above-described engagement protrusion 317. Also, the strip-like piezoelectric element E has at its central portion bonded a double-sided adhesive 318 that is used to bond and fix the touch panel TP to the strip-like piezoelectric element E.

When the above-mentioned, strip-like piezoelectric element E is mounted on the above-described supporting frame 300, the flexible printed wiring board F connected to one end side of the piezoelectric element E is engaged with the engagement protrusion 317 of the fixed portion 315 and then bonded to and fixed to the engagement protrusion 317. The flexible printed wiring board F connected to the other end of the strip-like piezoelectric element E is bonded and fixed to the fixed portion 316.

Next, operations of the strip-like piezoelectric element E mounted on the supporting frame 300 having the above-mentioned arrangement and structure will be described with reference to FIGS. 13A to 13C. In the case of this embodiment, the flexible printed wiring board Fa extended over the portion of the oblong hole 311 between one end of the strip-like piezoelectric element E and the fixed portion 315 and the flexible printed wiring board Fb (shown in FIGS. 13A to 13C) extended over the portion of the oblong hole 311 between the other end of the strip-like piezoelectric element E and the fixed portion 316 become the supporting members having the torsion resilient deformation structures. Accordingly, when the respective strip-like piezoelectric elements E are vibrated and displaced, the flexible printed wiring boards Fa, Fb near the respective portions in which the flexible printed wiring board F is connected to the strip-like piezoelectric element E are twisted and deformed with resiliency, and hence the strip-like piezoelectric element E can be vibrated and displaced substantially freely.

While the supporting frames 100, 200, 300 in the above-described respective embodiments are attached to the upper surface of the outer peripheral portion of the information display panel LCD as described above, the supporting frames are not limited to the above-mentioned structure in the information display device 1A of the present invention, and it is needless to say that the supporting frames 100, 200, 300 may be attached to the fixed portion provided on the outside of the information display panel LCD, for example.

As described above, according to the present invention, there is provided an information display device which is comprised of a touch panel, an information display panel located under the touch panel and a plurality of strip-like piezoelectric elements caused to be vibrated and displaced by a pressing force for pressing the touch panel, a plurality of strip-like piezoelectric elements being disposed at the outer peripheral portion of the touch panel; wherein the respective strip-like piezoelectric elements are supported at their respective end portions by members having torsion resilient deformation structures which do not disturb the strip-like piezoelectric elements from being vibrated and displaced.

According to the present invention, there is provided an information display device which is comprised of a touch panel, an information display panel located under the touch panel and a plurality of strip-like piezoelectric elements caused to be vibrated and displaced by a pressing force for pressing the touch panel, a plurality of strip-like piezoelectric elements being disposed at the outer peripheral portion of the touch panel, wherein the respective strip-like piezoelectric elements are supported at their respective end portions by a supporting frame having surface-like holders with torsion resilient deformation structures which do not disturb said strip-like piezoelectric elements from being vibrated and displaced.

Further, according to the present invention, there is provided a piezoelectric element supporting frame for use with an information display device having a structure which is comprised of a pair of surface-like holders having torsion resilient deformation structures, which do not disturb a strip-like piezoelectric element from being vibrated and displaced, being formed at both end portion sides of a rectangular hole and a stopper for limiting the lower limit of vibration and displacement of the central portion of the strip-like piezoelectric element being formed on the frame at the surface lower than the supporting surfaces of the two surface-like holders.

Further, according to the present invention, there is provided an information display device which is comprised of a touch panel, an information display panel located under the touch panel and a plurality of strip-like piezoelectric elements caused to be vibrated and displaced by a pressing force for pressing the touch panel, a plurality of strip-like piezoelectric elements being disposed at the outer peripheral portion of the touch panel, wherein the respective strip-like piezoelectric elements are fixed to a flexible printed wiring board, both end portions of the flexible printed wiring board are led out, the respective strip-like piezoelectric elements are supported by a supporting member formed on a frame so that they can be vibrated and displaced at least at one portion of their lower surfaces, and predetermined lengths are provided such that the two led-out portions of the flexible printed wiring board can be twisted and deformed with resiliency, the two led-out portions at the outside of the portion that is twisted and deformed with resiliency being fixed to a fixed portion of the frame and supported by a supporting frame.

Furthermore, according to the present invention, there is provided a piezoelectric element supporting frame for use with an information display device having a structure which is comprised of a supporting member which does not disturb a strip-like piezoelectric element from being vibrated and displaced being provided at the predetermined position of a rectangular hole, a stopper for limiting a lower limit of vibration and displacement of a central portion of the strip-like piezoelectric element being provided on the surface of the level lower than the upper surface of the supporting member, a fixed portion being formed on both end portions of the rectangular hole and a fixed portion having a positioning portion being formed on a frame at the same level surface as that of the upper surface of the supporting member.

Furthermore, according to the present invention, there is provided an information display device which is comprised of touch panel, an information display panel located under the touch panel and a plurality of strip-like piezoelectric elements caused to be vibrated and displaced by a pressing force for pressing the touch panel, a plurality of strip-like piezoelectric elements being disposed at the outer peripheral portion of the touch panel, wherein the respective strip-like piezoelectric elements are fixed to a flexible printed wiring board, both end portions of the flexible printed wiring board are led out, the respective strip-like piezoelectric elements are supported by a supporting member formed on a frame so that they can be vibrated and displaced at two portions of their lower surfaces, and predetermined lengths are provided such that the two led-out portions of the flexible printed wiring board can be twisted and deformed with resiliency, the two led-out portions at the outside of the portion that is twisted and deformed with resiliency being properly positioned by a protruded portion of the frame and fixed to a fixed portion of the same level surface as the upper surface of the supporting member and the two led-out portions at the outside of the other end portion that is twisted and deformed with resiliency are fixed to a fixed portion of the same level surface as the upper surface of the supporting member of the frame and supported by a supporting frame.

Furthermore, according to the present invention, there is provided a piezoelectric element supporting frame for use with an information display device having a structure which is comprised of a pair of supporting members, which do not disturb a strip-like piezoelectric element from being vibrated and displaced, being provided at predetermined space positions of a rectangular hole, a stopper for limiting a lower limit of vibration and displacement of a central portion of the strip-like piezoelectric element being provided on the surface of the level lower than the upper surfaces of a pair of supporting members, a fixed portion being formed on both end portions of the rectangular hole and a fixed portion having a positioning protruded portion being formed on a frame at the same level surface as that of the upper surface of the supporting member.

Therefore, according to the present invention, there can be achieved excellent effects. More specifically, the amount in which the vibration displacement produced by the piezoelectric element is lost when the piezoelectric element is fixed can be minimized in all attitudes of the touch panel while the piezoelectric element is being supported and fixed at its respective end portions on the surface.

Further, when the piezoelectric element is assembled, the piezoelectric element is urged against the holder or engaged with the holder and thereby properly positioned. Then, both end portions of the piezoelectric elements are fixed by double-sided adhesive tape, and hence it becomes very easy to assemble the piezoelectric element of the present invention as compared with the piezoelectric element having the related-art structure.

Furthermore, since the position at which the strip-like piezoelectric element is attached to the holder and the surface supporting position of the strip-like piezoelectric element at both end portions can be stabilized, it is possible to improve considerably the amount in which the vibration displacement is dispersed due to the assembly.

In addition, according to the present invention, it becomes possible to attain the objects for minimizing the loss of the vibration displacement of the piezoelectric element and for minimizing the dispersions of the assemblies of the piezoelectric element by the minimum number of assembly without increasing the thickness of the operation input and output device even when at least one end portion of the piezoelectric element is fixed at the surface.

Having described preferred embodiments of the invention with reference to the accompanying drawings, it is to be understood that the invention is not limited to these precise embodiments and various changes and modifications could be effected therein by one skilled in the art without departing from the spirit or scope of the invention as defined in the appended claims.

What is claimed is:

1. An information display device comprising:
   a touch panel;
   a frame supporting the touch panel, the frame having quadrilateral sides surrounding the touch panel with at least one side having at least one rectangular hole formed therein, the at least one rectangular hole extending longitudinally in a lengthwise direction and transversely in a widthwise direction;
   at least one strip-like piezoelectric element, which bows and arches in response to a force applied to said touch panel; and
   at least one torsion resilient deformation structure extending in the lengthwise and widthwise directions,
   wherein said at least one strip-like piezoelectric element is disposed adjacent an outer periphery of said touch panel,
   wherein the at least one torsion resilient deformation structure includes a first piezoelectric holder and a second piezoelectric holder spaced apart from one another, disposed in the at least one rectangular hole and connected to the frame, the first piezoelectric holder having a pair of first rotary shafts and a first piezoelectric flat panel-shaped holder, the first piezoelectric flat panel-shaped holder is disposed apart from the frame and has one first piezoelectric panel-shaped holder portion and another first piezoelectric panel-shaped holder portion integrally connected to the one first piezoelectric panel-shaped holder portion,
   wherein said at least one strip-like piezoelectric element is connected to the first and second piezoelectric holders and
   wherein respective ones of the pair of first rotary shafts are connected to the first piezoelectric holder at a unction of the one and the another first piezoelectric panel-shaped holder portions and extend in the widthwise direction to interconnect the first piezoelectric holder and the frame such that, upon applying the force to the touch panel, the at least one piezoelectric element bows and arches in response to the force applied to said touch panel while the pair of first rotary shafts twist in a resiliently biased manner and the first piezoelectric flat panel-shaped holder moves in a see-saw manner about the pair of first rotary shafts.

2. An information display device, as set forth in claim 1, wherein
   the second piezoelectric holder includes a bar member connected to the frame and extending across the at least one rectangular hole in the widthwise direction such that, in response to the force applied to said touch panel, the bar member twists in a resiliently biased manner.

3. A piezoelectric assembly for use with a touch panel information display device having a frame structure with a hole formed into the frame structure, the piezoelectric assembly comprising:
   At least one strip-like piezoelectric element: and
   a torsion resilient deformation structure extending~ in a lengthwise direction and a widthwise direction,
   wherein the at least one torsion resilient deformation structure includes a first piezoelectric holder and a second piezoelectric holder spaced apart from one another and disposed in the hole
   the first piezoelectric holder having a pair of first rotary shafts and a first piezoelectric flat panel-shaped holder, the first piezoelectric flat panel-shaped holder has one first piezoelectric panel-shaped holder portion and another first piezoelectric panel-shaped holder portion integrally connected to the one first piezoelectric panel-shaped holder portion, respective ones of the pair of first rotary shafts being connected to the first piezoelectric holder at a junction of the one and the another first piezoelectric panel-shaped holder portions and extend in the widthwise direction and the second piezoelectric holder includes a pair of second rotary shafts and a second piezoelectric flat panel-shaped holder, the second piezoelectric flat panel-shaped holder has one second piezoelectric panel-shaped holder portion and another second piezoelectric panel-shaped holder portion integrally connected to the one second piezoelectric panel-shaped holder portion, respective ones of the pair of second rotary shafts being connected to the first piezoelectric holder at a junction of the one and the another second piezoelectric panel-shaped holder portions and extending in the widthwise direction, and wherein said at least one strip-like piezoelectric element is connected to the first and second piezoelectric holders and wherein respective ones of the pair of first rotary shafts are connected to the first piezoelectric holder at a junction of the one and the another first piezoelectric panel-shaped holder portions and extend in the widthwise direction to interconnect the first piezoelectric holder and the frame structure such that, upon applying the force to the touch panel information display device, the at least one piezoelectric element bows and arches in response to the force applied to said touch panel while the pair of first rotary shafts twist in a resiliently biased manner and the first piezoelectric flat panel-shaped holder moves in a see-saw manner about the pair first rotary shafts.

4. A piezoelectric assembly, as set forth in claim 3, wherein the one torsion resilient deformation structure includes a stopper disposed in the hole.

5. A piezoelectric assembly, as set forth in claim 3, wherein the one first piezoelectric panel-shaped holder portion has a first piezoelectric butting portion formed at its outer end.

6. The information display device, as set forth in claim 1, wherein the strip-like piezoelectric elements are bimorph type piezoelectric elements.

7. The piezoelectric assembly, as set forth in claim 3, wherein the strip-like piezoelectric element is a bimorph type piezoelectric element comprising a steel shim, a plurality of ceramic layers, and a coating agent.

8. The information display device, as set forth in claim 1, wherein the second piezoelectric holder includes a pair of second rotary shafts and a second piezoelectric flat panel-shaped holder, the second piezoelectric flat panel-shaped holder being disposed apart from the frame and having one second piezoelectric panel-shaped holder portion and another second piezoelectric panel-shaped holder portion integrally connected to the one second piezoelectric panel-shaped holder portion, respective ones of the pair of second rotary shafts being connected to the first piezoelectric holder at a junction of the one and the another second piezoelectric panel-shaped holder portions and extending in the widthwise direction to interconnect the second piezoelectric holder and the frame such that, upon applying the force to the touch panel, the at least one piezoelectric element bows and arches in response to the force applied to said touch panel while the pair of second rotary shafts twist in a resiliently biased manner and the second piezoelectric flat panel-shaped holder moves in an see-saw manner about the pair of second rotary shafts relative to the first piezoelectric flat panel-shaped holder.

9. The information display device, as set forth in claim 1, wherein the at least one torsion resilient deformation structure includes a stopper disposed in the at least one rectangular hole and operative to limit movement of at least one strip-like piezoelectric element into the hole when the at least one strip-like piezoelectric element bows and arches in response to the force applied to said touch panel.

10. The information display device, as set forth in claim 9, wherein the stopper is disposed between the first piezoelectric holder and the second piezoelectric holder.

11. A piezoelectric assembly, as set forth in claim 3, wherein the one second piezoelectric panel-shaped holder portion has a second piezoelectric butting portion formed at its outer end.

12. The information display device, as set forth in claim 4, wherein the stopper disposed between the first piezoelectric holder and the second piezoelectric holder.

* * * * *